Nov. 12, 1957 R. LONGARZO 2,812,617
ELECTRICALLY PROPELLED MODEL VEHICLES
Filed July 22, 1955 2 Sheets—Sheet 1

INVENTOR.
ROLAND LONGARZO
BY
Howard G. Russell
his ATTORNEY

Nov. 12, 1957 R. LONGARZO 2,812,617
ELECTRICALLY PROPELLED MODEL VEHICLES
Filed July 22, 1955 2 Sheets-Sheet 2

INVENTOR.
ROLAND LONGARZO
BY
Howard G. Russell
his ATTORNEY

United States Patent Office 2,812,617
Patented Nov. 12, 1957

2,812,617

ELECTRICALLY PROPELLED MODEL VEHICLES

Roland Longarzo, Valley Stream, N. Y., assignor to Polk's Model Craft Hobbies, Inc., New York, N. Y., a corporation of New York Application July 22, 1955, Serial No. 523,779

4 Claims. (Cl. 46—230)

This invention relates to improvements in electrically operated model vehicles.

In model railroading traffic systems the primary aim of the layout, and of the construction and operation of the vehicles operated thereon, is to achieve realistic appearance, so that the model vehicles look and operate as closely as possible to the large scale prototypes after which they are patterned.

In recent years model railroads have been supplemented by model busses and model streetcars. These are frequently operated in conjunction with model trains, but are also operated separately. In a combined layout model busses and streetcars are occasionally routed to cross railroad tracks and are automatically operated to observe warning lights at grade crossings, and even traffic lights at street intersections.

In order to achieve realism it is desirable to operate the doors in such a way as to simulate the door operation of the large prototype at bus stops or at stops in advance of railroad crossings.

The invention provides a mechanism which automatically opens the doors when the bus or streetcar stops and closes the doors when the bus or streetcar starts up. Additional refinements may be provided in the form of stop lights or other lights which light when the doors open and are extinguished when the doors close.

According to the invention the doors are operated in dependence on the flow of the propulsion current which drives the vehicle. It is evident that the arrangement which will be specifically described for busses is also applicable to rail vehicles, for example self-propelled railroad cars, streetcars and other types of cars.

It has heretofore been proposed to operate doors in model railroad cars by means of electromagnets or solenoids. The known installations, however, require special operating circuits and generally also special contact devices along the tracks. The operation of doors is therefore limited to certain points of the layout and it is not possible to open the doors at other points. The present invention does not require special circuits or special contact devices. For this reason the invention is admirably suited for use in connection with trolley busses in which special contact devices would detract from the realistic appearance.

The various features of the invention will appear from the detailed description which follows accompanied by drawings showing, for the purpose of illustration, a preferred embodiment of the invention applied to trolly busses. The invention also resides in certain new and original features of construction and a combination of elements hereinafter set forth and claimed.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings, forming a part of it, in which:

Figure 1:
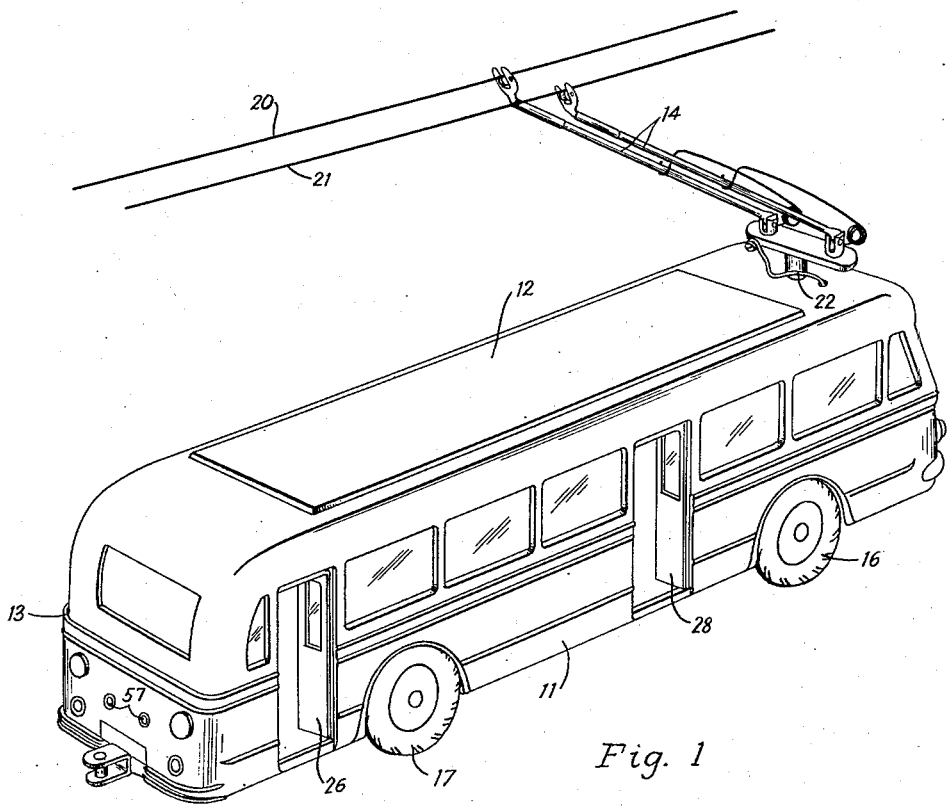
Fig. 1 is a perspective view of the trolley bus incorporating the invention.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of broader aspects of the invention, but it is understood that the details may be modified in various respects without departure from the principles of the invention and that the invention may be applied to other structures than the one shown.

The trolley bus illustrated in Fig. 1 comprises two body portions 11 and 12, joined together at 13. Portion 11 forms the undercarriage containing the mechanical equipment. The portion 12 comprises essentially the roof and the windows. Both portions are preferably formed of thermoplastic material and are therefore non-conductive to an electric current.

Figure 2:
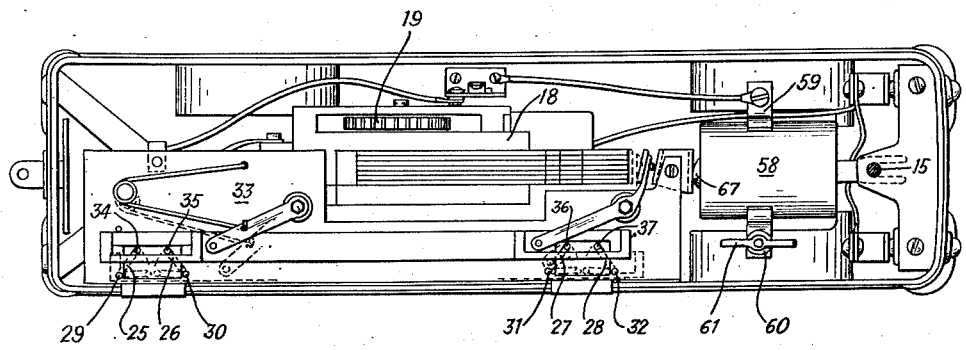
Fig. 2 is a plan view of the bus of Fig. 1, its top being removed to show the mechanism for opening the door.

The trolley bus is fitted with twin trolley poles 14 mounted on a shaft 15 (Fig. 2) which also operates a suitable steering mechanism (not shown) for the front wheels 16. The rear wheels 17 are driven by an electric motor 18 through a train of reduction gears, visible in part at 19. Power is supplied to the motor from trolley wire 20, through one of the trolley poles 14 and thence through a flexible conductor 22 leading to the motor winding 54 (Fig. 3), the circuit being completed through a second conductor 23 leading to the metallic structure of the bus at 24 and thence through the metallic mass of the bus including the trolley shaft 15 to the other trolley pole and trolley wire 21.

The bus body is fitted with movable centrally divided doors 25, 26, 27 and 28. These doors are pivotally mounted at 29, 30, 31 and 32 (Figs. 2 and 3), the top pivots being held in a metal plate 33. The doors have operating pins 34, 35, 36 and 37 engaging elongated slots 38 and 39 in an operating bar 40. The operating bar is movably mounted on arms 41 and 42 and may be moved from the position shown in solid lines into the position shown in broken lines. In the latter position the doors of the bus are closed by reason of the fact that the bar causes the pins 34, 35 and 36, 37 to move towards each other.

The arm 42 is pivotally connected to the operating bar 43 and is pivotally mounted to the plate 33 at 44. A spring 45 of the safety pin type urges the arm 42 and the operating bar 40 into the position in which the doors are open. This is the position shown in solid lines.

The arm 41 is constructed as a double-armed lever and is pivotally connected to the operating bar at 46. The lever 41 is pivotally secured to the plate 33 at 47 and its other arm 48 carries an armature 49 opposite a pair of poles 50, 51 of the motor 18.

Figure 4:
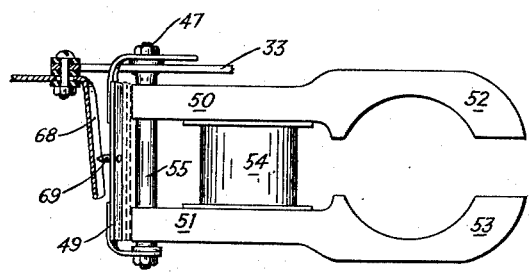
Fig. 4 is a side elevation of a portion of the propulsion motor of the bus fitted with poles and a movable armature for operating the door mechanism and optional switching mechanism.

Details of this construction are illustrated in Fig. 4 showing the poles 50 and 51 which operate the armature 49 and the conventional poles 52 and 53 which operate the conventional rotating motor armature (not shown). The stator winding of the motor is shown at 54. The armature 49 for opening the doors is mounted on the pivotal shaft 47 extending through a brass bushing 55 whose upper end is secured to the plate 33.

From the foregoing description it is evident that the door opening armature 49 is pulled up as soon as the stator winding 54 is energized. When the stator winding is deenergized the biasing spring 45 acting on the armature 49 through the arm 42 and the bar 40 causes the armature 49 to be swung away from the poles 50 and 51. The doors are therefore operated in response to the flow of propulsion current in the sense that electrical energy supplied for the purpose of propelling the bus also causes the doors to close. Interruption of the propulsion current causes the bus to stop and the doors to open automatically by the action of the biasing spring 45.

The door opening armature 49 may also be used to control a circuit for operating a stop light 56 visible through red stop light crystals 57 in the bus body 11.

The stop light is powered by a small battery 58 of the hearing aid type. This battery is held by clamps 59 and 60, the latter having a wing nut 61 for convenient removal and replacement of the battery.

A manually operable switch 62 accessible from the underside of the bus is used for disconnecting the battery when the bus is not in use.

The sleeve contact of the base of the stop light bulb is grounded by reason of its being held in the sleeve 63 of the lamp socket mounted on the plate 33 by a metal bracket 64. From the tip contact of the bulb a conductor 65 leads to the switch 62 and thence a further conductor 66 leads to the clamp 59 making contact with the metallic enclosure of the battery 58. The battery has a terminal 67 making contact with a substantially U-shaped metal bracket 68 opposite the armature 49. The armature has a contact point 69 resting against the bracket 68 when the armature 49 is released. The contact 68, 69 is broken when the armature 49 is pulled up.

Figure 3:
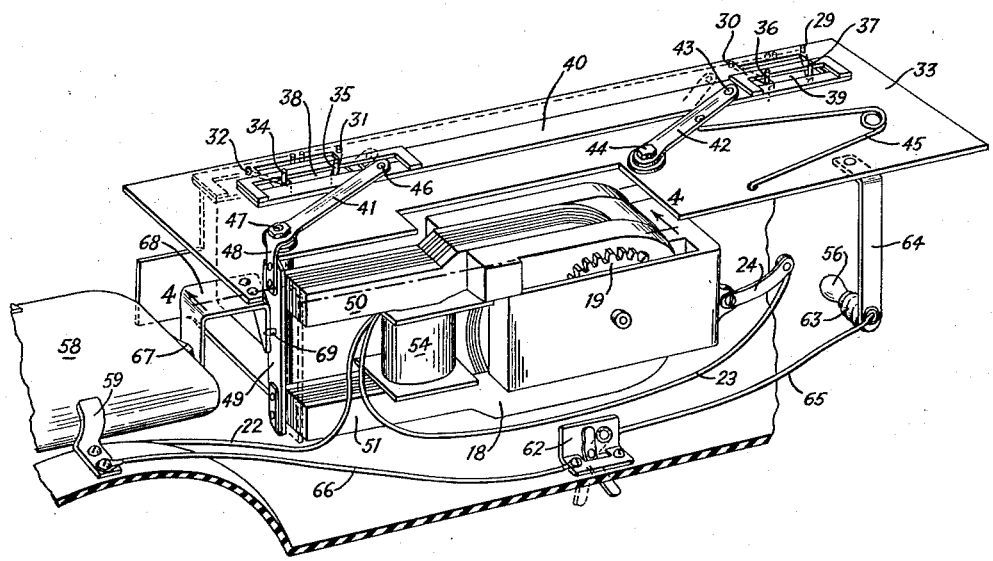
Fig. 3 is a perspective view, on an enlarged scale, of the door opening mechanism viewed from the other side.

In Fig. 3 the switch 62 is shown in open position. Assuming the switch 62 is closed by moving its arm in a clockwise direction, the stop light 56 is operated through the following circuit: From mass 33 through the bulb 56, conductor 65, switch 62, conductor 66, clamp 59, through the battery 58, terminal 67, metal bracket 68, contact point 69, armature 49, back to mass 33. The stop light will go out as soon as propulsion current flows through the motor armature. This causes the armature 49 to be pulled up and the contacts 68, 69 to be broken. Simultaneously the doors are closed in the previously described manner.

What is claimed is:

1. A toy trolley bus comprising, a vehicle body; two trolley poles for supplying electrical energy for propulsion of the bus; at least one traction wheel; an electric motor, said motor having a stator winding in series with the trolley poles and a rotatable armature for driving said traction wheel; a movable second armature in the field of said winding, said second armature being adapted to be pulled up when said stator winding is energized; a movable door in said body; means operable by said second armature for moving said door into closed position when said armature is pulled up; and biasing means acting in the opposite sense for moving the door into open position when said second armature is released.

2. A toy trolley bus comprising, a vehicle body; two trolley poles for supplying electrical energy for propulsion of the bus; a pair of traction wheels; an electric motor comprising a field winding in series with said trolley poles; a rotatable first armature for driving said traction wheels, and a reciprocable second armature adapted to be pulled up when said winding is energized; a movable door movable into an open and into a closed position; means operable by said second armature for moving the door into closed position when the armature is pulled up; and a spring opposing the action of said second armature for moving the door into open position when said winding is deenergized.

3. A toy trolley bus comprising, a vehicle body; two trolley poles for supplying electrical energy for propulsion of the bus; a pair of traction wheels; an electric motor comprising a stator winding in series with the trolley poles, a rotatable first armature for driving said traction wheels and a reciprocable second armature adapted to be pulled up when said winding is energized; a movable door in said body movable into an open and into a closed position; means operable by said second armature for moving said door into closed position when said armature is pulled up; biasing means acting in the opposite sense for moving the door into open position; break-contacts operated by said second armature; a stop light; a battery in said body; and a stop light circuit including said break-contacts, stop light and battery for energizing said stop light when the door is open and said second armature is released.

4. A toy vehicle for use in a model traffic system operated by electricity, said vehicle comprising, a body; at least one traction wheel; a movable door in said body; a propulsion motor for operating said vehicle, said motor comprising, a stator including a field winding, a first armature mounted for rotation about a horizontal axis within the stator field for driving said traction wheel; a second armature pivotally mounted about a vertical axis, said second armature being within the magnetic field of the stator and adapted to be pulled up when said field is energized; means for supplying said motor with propulsion current; means operable by said second armature for moving said door into closed position when said armature is pulled up; and biasing means opposing the action of the armature for moving the door into open position when said second armature is released.

References Cited in the file of this patent

UNITED STATES PATENTS

| 2,146,665 | Wood | Feb. 7, 1939 |
| 2,450,867 | Smith | Oct. 5, 1948 |

FOREIGN PATENTS

| 577,696 | Germany | June 2, 1933 |
| 808,441 | Germany | July 16, 1951 |